(12) United States Patent
Lai et al.

(10) Patent No.: US 9,985,539 B1
(45) Date of Patent: May 29, 2018

(54) POWER CONTROLLER WITH TURN-ON TIME CONFIGURED ACCORDING TO NUMBER OF CURRENT LIMIT OPERATIONS

(71) Applicant: JOINT POWER EXPONENT, LTD., Hsinchu (TW)

(72) Inventors: Jyh-Ting Lai, Hsinchu (TW); Yu-Che Liu, Hsinchu (TW); Yung-Chou Lee, Hsinchu (TW)

(73) Assignee: Joint Power Exponent, Ltd., Hsinchu (TW)

( * ) Notice: Subject to any disclaimer, the term of this patent is extended or adjusted under 35 U.S.C. 154(b) by 0 days. days.

(21) Appl. No.: 15/812,318

(22) Filed: Nov. 14, 2017

(30) Foreign Application Priority Data

Dec. 7, 2016 (TW) .............................. 105140439 A (51) Int. Cl.
*H02M 1/32* (2007.01)
*H02M 3/335* (2006.01)
*H02M 1/08* (2006.01)

(52) U.S. Cl.
CPC ......... *H02M 3/33523* (2013.01); *H02M 1/08* (2013.01)

(58) Field of Classification Search
CPC . H02M 2001/0009; H02M 2001/0012; H02M 1/32
USPC ........... 323/282, 283, 285; 363/21.04, 21.05, 363/21.09, 21.11, 21.12, 21.13, 21.17, 363/21.18, 56.1, 97
See application file for complete search history.

(56) References Cited

U.S. PATENT DOCUMENTS

| 5,757,214 | A | * | 5/1998 | Stoddard | H01H 47/325 323/282 |
| 7,848,117 | B2 | | 12/2010 | Reinberger et al. | |
| 8,102,164 | B2 | * | 1/2012 | Colbeck | H02M 1/4225 323/271 |
| 8,274,799 | B2 | | 9/2012 | Reinberger et al. | |
| 2008/0088292 | A1 | * | 4/2008 | Stoichita | H02M 3/156 323/285 |
| 2010/0195355 | A1 | * | 8/2010 | Zheng | H02M 3/33507 363/21.12 |

(Continued)

FOREIGN PATENT DOCUMENTS

| CN | 102761248 B | 9/2014 |
| TW | 201545448 A | 9/2014 |
| TW | I539729 B | 6/2016 |

*Primary Examiner* — Jeffrey Sterrett
(74) *Attorney, Agent, or Firm* — Muncy, Geissler, Olds & Lowe, P.C.

(57) ABSTRACT

A power controller is provided. The power controller has a peak current setting unit utilized for deciding a peak current value according to a divided input voltage and a current limit turn-on time value. The comparator sends a first trigger signal once a current value of a power switch of the power system reaches the peak current value. The turn-on time calculation module defines the number of current limit operations by using the count of first trigger signals received in a calculation time period and then processes a recursive calculation to calculate a turn-on time value according to the current limit turn-on time value, the number of current limit operations, and a target number of current limit operations. The timer transmits a second trigger signal when the set turn-on time value is counted. The switch control module turns off the power switch when receiving one of the first and the second trigger signal.

5 Claims, 5 Drawing Sheets

(56) References Cited

U.S. PATENT DOCUMENTS

| | | | |
|---|---|---|---|
| 2010/0208502 A1* | 8/2010 | Horii | H02M 3/33507 363/131 |
| 2013/0057173 A1* | 3/2013 | Yao | H05B 33/0815 315/206 |
| 2013/0070379 A1 | 3/2013 | Pan et al. | |
| 2013/0249427 A1* | 9/2013 | Jin | H05B 33/0815 315/205 |
| 2013/0314067 A1* | 11/2013 | Matzberger | H02M 3/1588 323/311 |
| 2016/0057822 A1* | 2/2016 | Chu | H02M 1/4208 315/201 |

* cited by examiner

POWER CONTROLLER WITH TURN-ON TIME CONFIGURED ACCORDING TO NUMBER OF CURRENT LIMIT OPERATIONS

BACKGROUND OF INVENTION

1. Field of the Invention

The present invention is related to a power controller with turn-on time being configured according to the number of current limit operations, and more particularly is related to a power controller with turn-on time being configured according to the number of current limit operations and the peak current being decided according to the turn-on time.

2. Description of the Prior Art

Attending with the progress of technology, the rapid development of electronic devices has broadly improved the quality of life. Because of the massive growth of electronic devices, the demand of power controller increases. For example, the light-emitting diode (LED) lighting systems or the transformers need to use the power controller.

Figure 1:
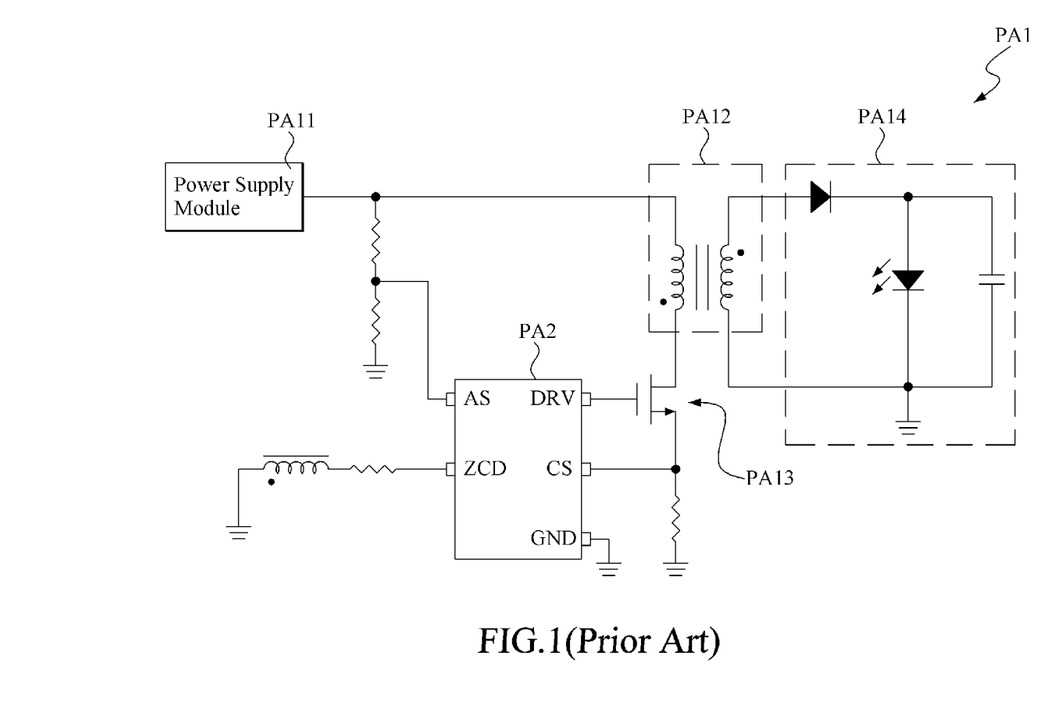
FIG. 1 is a circuit diagram showing a conventional power system.

In terms of control methods, primary side regulation and quasi resonant control are the two control methods broadly used in the conventional power controllers. FIG. 1 is a circuit diagram showing a conventional power system.

As show in FIG. 1, in general, the conventional power system PA1 includes a power supply module PA11, a transformer PA12, a power switch PA13, and a load PA14. The transformer PA12 is electrically connected to the power supply module PA11, the power switch PA13 is electrically connected to the primary side winding of the transformer PA12, the load PA14 is electrically connected to the secondary side winding of the transformer PA12, and the power controller PA2 is electrically connected to the power supply module PA11, the primary side winding of the transformer PA12, and the power switch PA13.

Take the control method of primary side regulation as an example, the power controller PA2 receives a signal from the secondary side winding of the transformer PA12 through a voltage divider, calculates the average value after taking the positive values of the detected signal, and uses the average value, which is proportional to the output voltage, to adjust the turn-on time of the power switch so as to control the current flowing through the secondary side of the transformer.

However, the aforementioned control method cannot impose a limit to the peak current, and a bigger transformer would be needed to withstand the unlimited peak current. In addition, because the peak current is unadjustable, the circuit cannot be used in various circuit topologies and real-time circuit protection cannot be achieved.

SUMMARY OF THE INVENTION

In view of the conventional technology mentioned above, it is common to have the problems of large layout area, unadoptable to various circuit topologies, and lack of real-time circuit protection. Accordingly, a power controller with turn-on time being configured according to the number of current limit operations is provided in accordance with the present invention, which sets the turn-on time according to the number of current limit operations and uses the turn-on time to decide the peak current value so as to achieve the object of an adjustable peak current value.

In accordance with the aforementioned object, a power controller with turn-on time being configured according to a number of current limit operations is provided. The power controller with turn-on time configured according to a number of current limit operations is applied to a power system, which includes a power supply module, a voltage divider, and a power switch. The power supply module is utilized for providing an input voltage. The voltage divider is electrically connected to the power supply module for receiving the input voltage to generate a divided input voltage. The power switch is electrically connected to the voltage divider. The power controller comprises a peak current setting unit, a comparator, a turn-on time calculation module, a timer, and a switch control module. The peak current setting unit is electrically connected to the voltage divider and receives a current limit turn-on time value for determining a peak current value according to the divided input voltage and the current limit turn-on time value. The comparator is electrically connected to the peak current setting unit and the power switch for transmitting a first trigger signal once a current value of the power switch reaches the peak current value.

The turn-on time calculation module is electrically connected to the peak current setting unit and the comparator, and is set with a calculation time period and a target number of current limit operations for calculating a count of the first trigger signals being received during the calculation time period to define a number of current limit operations. The turn-on time calculation module also calculates a set turn-on time value by using the current limit turn-on time value, the number of current limit operations, and the target number of current limit operations to do a recursive calculation. The timer is electrically connected to the turn-on time calculation module for transmitting a second trigger signal when the set turn-on time value is counted. The switch control module is electrically connected to the comparator, the timer, and the power switch, for transmitting a cutoff signal to the power switch to turn off the power switch when receiving one of the first trigger signal and the second trigger signal, and the switch control module turns on the power switch after a cutoff time period. Wherein the turn-on time calculation module transmits the set turn-on time value to the peak current setting unit to replace the current limit turn-on time value.

In accordance to an embodiment of the aforementioned power controller with turn-on time being configured according to the number of current limit operations, the turn-on time calculation module comprises a current limit calculation unit, a subtractor, a multiplier, and an adder. The current limit calculation unit is set with the calculation time period and is electrically connected to the comparator for defining the count of the first trigger signals received during the calculation time period as the number of current limit operations. The subtractor is electrically connected to the current limit calculation unit for calculating a number difference of current limit operations between the target number of current limit operations and the number of current limit operations. The multiplier is electrically connected to the subtractor and is set with a multiplying value for multiplying the number difference of current limit operations and the multiplying value to generate a multiplied time value. The adder is electrically connected to the multiplier, for receiving the current limit turn-on time value, and adding the multiplied time value to the current limit turn-on time value to generate the set turn-on time value.

In accordance with an embodiment of the aforementioned power controller with turn-on time configured according to a number of current limit operations, the turn-on time calculation module further comprises a delay circuit. The delay circuit has an input and an output electrically connected to the adder for delaying the set turn-on time value, and the delay circuit is an unit delay circuit.

In accordance with an embodiment of the aforementioned power controller with turn-on time configured according to a number of current limit operations, the switch control module comprises an OR gate and a SR flip-flop. The OR gate is electrically connected to the comparator and the timer for transmitting an OR gate signal when receiving one of the first trigger signal and the second trigger signal. The SR flip-flop is electrically connected to the OR gate and the power switch for transmitting the cutoff signal when receiving the OR gate signal.

By using the power controller with turn-on time being configured according to the number of current limit operations provided in the present invention, because the turn-on time is set according to the number of the current limit operations and the peak current value is decided according to the turn-on time, the peak current value can be adjusted effectively such that the size of the transformer can be reduced, the withstanding voltage of the power switch can be adjusted, the Schottky diode on the secondary side of the transformer can be adjusted, the power factor (PF) can be adjusted, and thus the circuit can be applied to various circuit topologies, such as the system with high PF, the system with lower PF, single-stage architecture, or multi-stage architecture, to facilitate the use.

BRIEF DESCRIPTION OF THE DRAWINGS

The present invention will now be specified with reference to its preferred embodiment illustrated in the drawings, in which.

DESCRIPTION OF THE PREFERRED EMBODIMENT

There are various embodiments of the power controller with turn-on time being configured according the number of current limit operations in accordance with the present invention, which are not repeated hereby. Only one preferred embodiment is mentioned in the following paragraph as an example.

Figure 2:
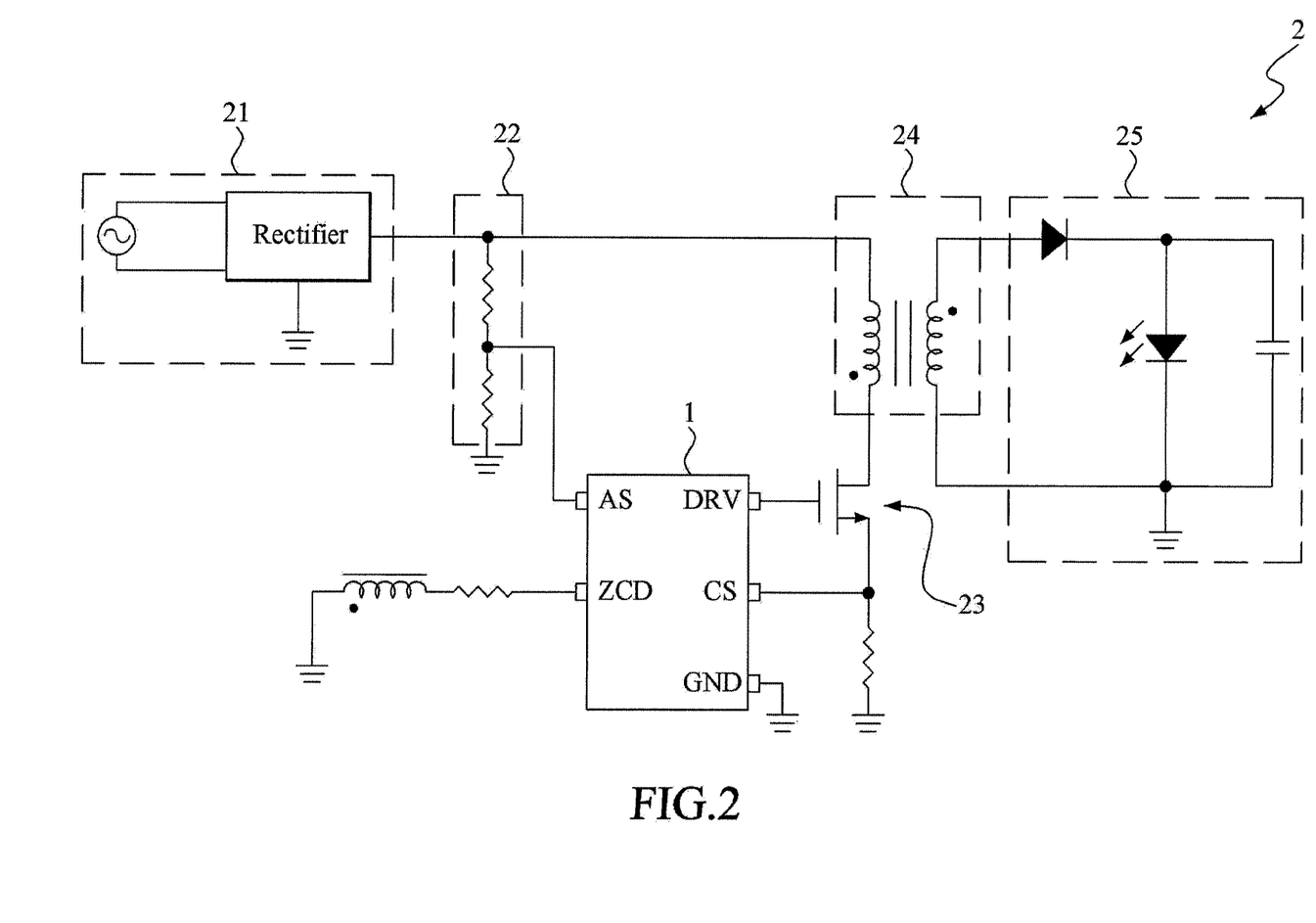
FIG. 2 is a circuit diagram showing a power system provided in accordance with a preferred embodiment of the present invention.
Figure 3:
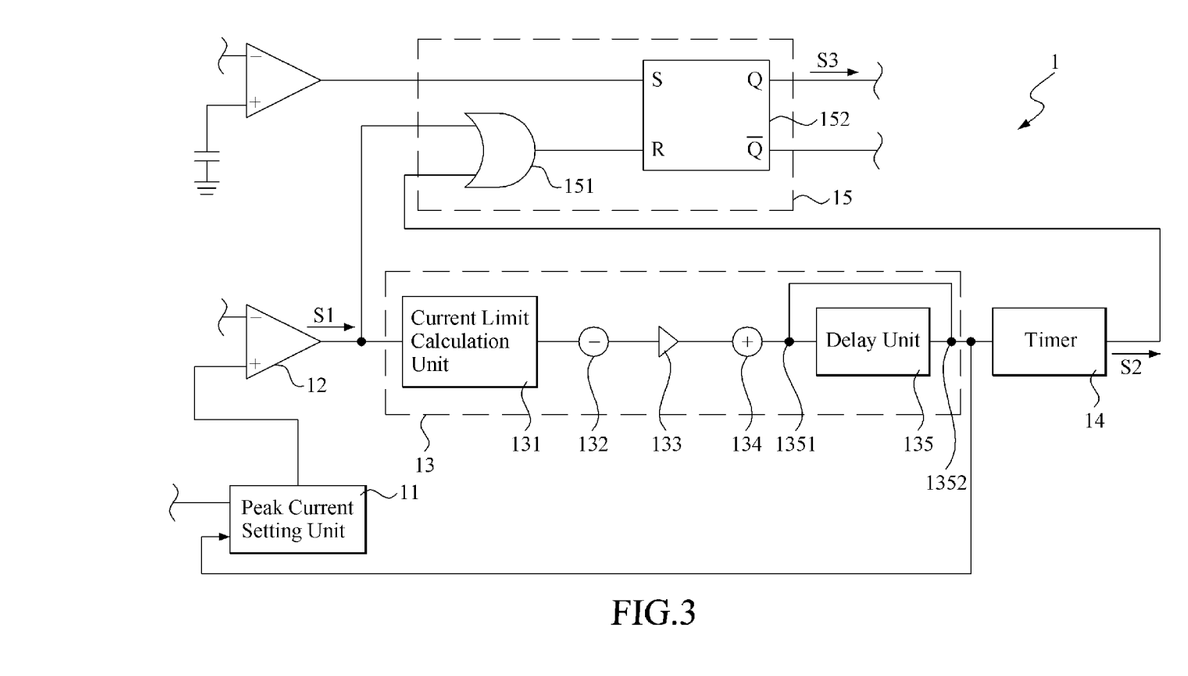
FIG. 3 is a block diagram showing a power controller with turn-on time being configured according the number of the current limit operations provided in accordance with a preferred embodiment of the present invention.

Please refer to FIG. 2 and FIG. 3, wherein FIG. 2 is a circuit diagram showing a power system provided in accordance with a preferred embodiment of the present invention and FIG. 3 is a block diagram showing a power controller with turn-on time being configured according the number of the current limit operations provided in accordance with a preferred embodiment of the present invention.

As shown, the power controller 1 with turn-on time being configured according to the number of current limit operations in accordance with a preferred embodiment of the present invention is applied to a power system 2, which includes a power supply module 21, a voltage divider 22, a power switch 23, and transformer 24, and a load 25.

The power supply module 21 includes an AC power source and a rectifier in general, which is well known in the art and thus is not repeated here. The voltage divider 22 is electrically connected to the power supply module 21 and is composed of two resistors in general. The power switch 23 is electrically connected to the voltage divider 22. Concretely speaking, the power switch 23 is electrically connected to the voltage divider 22 through the primary side of the transformer 24, and the load 25 is electrically connected to the secondary side of the transformer 24. The load 25 can be the electronic device includes the diode, the capacitor, the optical photo-coupler, and the photo diode for example, but it is well known that the load 25 may include electronic components other than the aforementioned components and thus the present invention should not be restricted thereto.

The power controller 1 with turn-on time being configured according to the number of current limit operations comprises a peak current setting unit 11, a comparator 12, a turn-on time calculation module 13, a timer 14, and a switch control module 15.

The peak current setting unit 11 is electrically connected to the voltage divider 22 (the peak current setting unit 11 has one end corresponding to the AS pin in FIG. 2) and receives a current limit turn-on time value. The current limit turn-on time value can be a current limit duty ratio, such as 40% to indicate 40% of the switching time, but the present invention is not restricted thereto.

The comparator 12 is electrically connected to the peak current setting unit 11 and the power switch 23. The comparator 12 has one end corresponding to the CS pin in FIG. 2. The turn-on time calculation module 13 is electrically connected to the peak current setting unit 11 and the comparator 12, and is set with a calculation time period and a target number of current limit operations. Basically, the calculation time period and the target number of current limit operations can be manually set.

Concretely speaking, the turn-on time calculation module 13 comprises a current limit calculation unit 131, a subtractor 132, a multiplier 133, an adder 134, and a delay circuit 135. The current limit calculation unit 131 is set with the aforementioned calculation time period and is electrically connected to the comparator 12. The subtractor 132 is electrically connected to the current limit calculation unit 131. The multiplier 133 is electrically connected to the subtractor 132 and is set with a multiplying value (defined as k for example, the multiplying value is utilized for adjusting the speed to trace the turn-on time). The adder 134 is electrically connected to the multiplier 133. The delay circuit 135 has an input 1351 and an output 1352 electrically connected to the adder 134 and can be an Unit Delay circuit.

The timer 14 is electrically connected to the output 1352 of the delay circuit 135 of the turn-on time calculation module 13. The switch control module 15 is electrically connected to the comparator 12, the timer 114, and the power switch 23. Concretely speaking, the switch control module 15 comprises an OR gate 151 and a SR flip-flop 152. The OR gate 151 is electrically connected to the comparator 12 and the timer 14. The SR flip-flop 152 is electrically connected to the OR gate 151 and the power switch 23, that is, the Q output of the SR flip-flop 152 is corresponding to the DRV pin shown in FIG. 2.

In addition, in accordance with the preferred embodiment of the present invention, the power controller 1 with turn-on time being configured according to the number of current limit operations further comprises a zero-current comparator (which is located at the upper left corner, but is not labelled in the figure). The zero-current comparator has one end corresponding to the ZCD pin shown in FIG. 2 and another end electrically connected to a voltage source.

Figure 4:
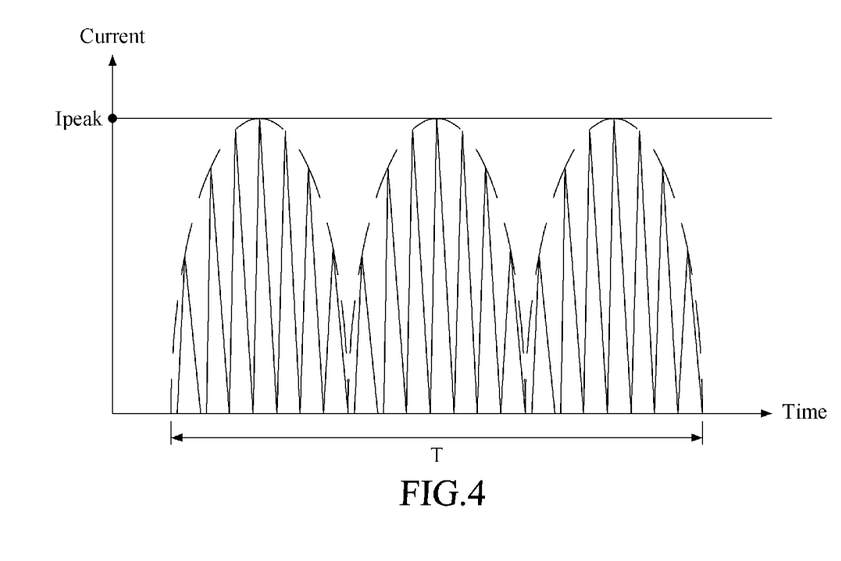
FIG. 4 is a schematic diagram showing a first waveform of the peak current value provided in accordance with a preferred embodiment of the present invention.
Figure 5:
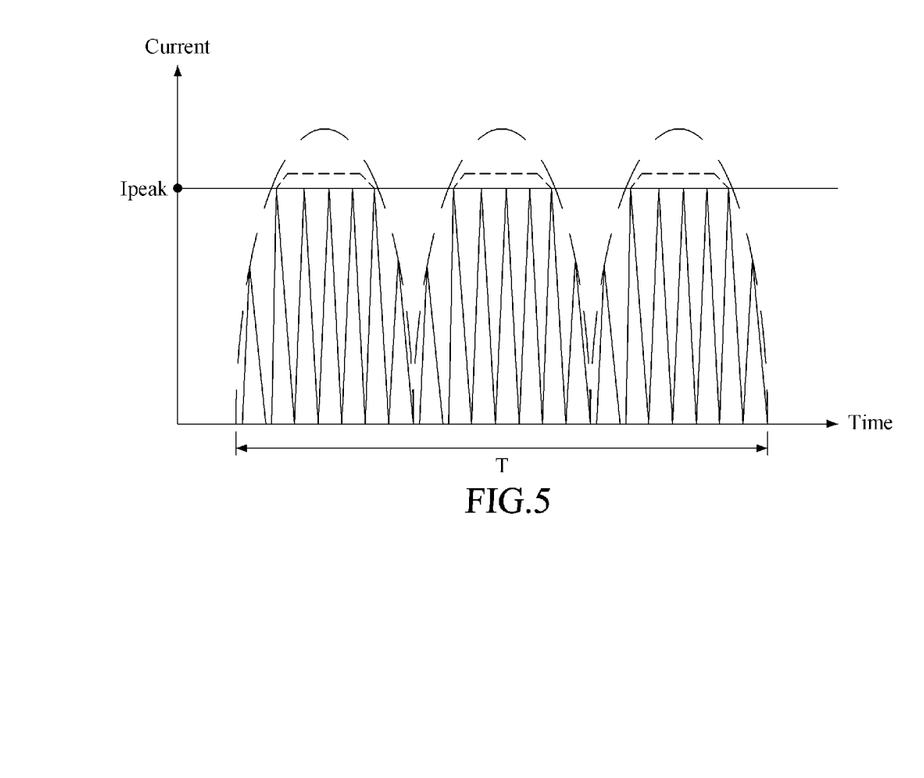
FIG. 5 is a schematic diagram showing a second waveform of the peak current value provided in accordance with a preferred embodiment of the present invention

Please refer to FIG. 2 to FIG. 5, wherein FIG. 4 is a schematic diagram showing a first waveform of the peak current value provided in accordance with a preferred embodiment of the present invention, and FIG. 5 is a schematic diagram showing a second waveform of the peak current value provided in accordance with a preferred embodiment of the present invention. As shown, the power supply module 21 is utilized for providing an input voltage, the voltage divider 22 is utilized for receiving the input voltage to generate a divided input voltage, and the peak current setting unit 11 is utilized for determining a peak current value according to the divided input voltage and the current limit turn-on time value. For example, the relationship among the divided input voltage, the current limit turn-on time value, and the peak current value can be simulated in advance and stored in the peak current setting unit 11. The peak current setting unit 11 may decide the peak current value by using the lookup table or by the way of calculation. However, the present invention should not be restricted thereto. In addition, as a preferred embodiment, the peak current value can be a threshold value.

For example, if the peak current value is decided by the way of calculation, the equation $I_{peak}=(V_{in}/L_p) \times T_{on}$ can be used to access the peak current value, where $I_{peak}$ is the peak current value, $V_{in}$ is the divided input voltage, $L_p$ is the inductance of the primary side inductor of the transformer 24 (which is a constant value in general), $T_{on}$ is the current limit turn-on time.

The comparator 12 is utilized for transmitting a first trigger signal S1 once a current value of the power switch 23, which in general is also the current value of the inductor, reaches the peak current value $I_{peak}$. The turn-on time calculation module 13 is utilized for calculating a count of the first trigger signals S1 being received during the calculation time period (e.g. represented as T) to define a number of current limit operations, and also calculating a set turn-on time value by using the current limit turn-on time value, the number of current limit operations, and the target number of current limit operations to do a recursive calculation.

For example, as shown in FIG. 4, three complete waveforms (such as the waveforms of the primary side current of the transformer 24) are found in the calculation time period, the current limit calculation unit 131 of the turn-on time calculation module 13 receives the first trigger signal S1 three times and defines the number of current limit operations (e.g. represented as N1) as three, the subtractor 132 calculates a number difference of current limit operations (e.g. represented as N2) between the target number of current limit operations and the number of current limit operations. For example, if the target number of current limit operations is 15, the number difference of current limit operations would be 12, i.e. 15 minus 3.

The multiplier 133 is utilized for multiplying the number difference of current limit operations and the multiplying value to generate a multiplied time value. The adder 134 is utilized for receiving the current limit turn-on time value (e.g. represented as T(n)), and adding the multiplied time value to the current limit turn-on time value to generate the set turn-on time value (e.g. represented as T(n+1)). The delay circuit 135 is utilized for delaying the set turn-on time value, and transmitting the set turn-on time value to the adder 134. That is, the recursive calculation mentioned in the present preferred embodiment is T(n+1)=T(n)+k(N2−N1), the calculation repeats until T(n+1)=T(n), such that the final number of current limit operations would be changed to the target number of current limit operations, i.e. 15 times as shown in FIG. 5.

In addition, the turn-on time calculation module 13 transmits the set turn-on time value to the peak current setting unit 11 to replace the current limit turn-on time value so as to achieve the object of real-time turn-on time tracing and adjustment of peak current value. That is, after using the set turn-on time value to replace the current limit turn-on time value, the peak current setting unit 11 may decide a new peak current value by using the set turn-on time value and the divided input voltage such that the peak current value would be adjusted repeatedly, and the turn-on time calculation module 13 may use the new peak current value and the calculation time period to define a new number of current limit operations and use the new number to calculate a new set turn-on time value.

The timer 14 transmits a second trigger signal S2 when the set turn-on time value is counted. The OR gate 151 of the switch control module 15 transmits a cutoff signal S3 to the power switch 23 to turn off the power switch 23 when receiving one of the first trigger signal S1 and the second trigger signal S2, and turns on the power switch 23 after a cutoff time period.

The cutoff time period may be decided by the zero-current comparator, i.e. the power switch 23 would be turned on when the inductor current is detected to be 0. However, it is understood that there are various embodiments can be used to achieve the object to switch the power switch 23 repeatedly for calculating the number of current limit operations, and thus the present invention should not be restricted thereto. In addition, as shown in FIG. 5, each complete waveform has two triangle waves which do not reach the peak current value, the two triangle waves may be corresponding to the condition that the timer 14 transmits the second trigger signal S2 to turn off the power switch 23. However, the present invention should not be restricted thereto.

Moreover, after the set turn-on time value is calculated, the peak current value would be declined such that the count that the current value reaches the peak current value would be increased to have the number of current limit operations reaching the target number of current limit operations. Thus, the greater the peak current value, the smaller the number of the current limit operations, and thus a smaller target number of current limit operations can be set; the smaller the peak current value, the greater the number of current limit operations, and thus a greater target number of current limit operations can be set; and the higher the divided input voltage, the lower the peak current value.

In conclusion, by using the power controller with turn-on time being configured according to the number of current limit operations provided in the present invention, because the turn-on time is set according to the number of the current limit operations and the peak current value is decided according to the turn-on time, the peak current value can be adjusted effectively such that the size of the transformer can be reduced, the withstanding voltage of the power switch can be adjusted, the Schottky diode on the secondary side of the transformer can be adjusted, the power factor (PF) can be adjusted, and thus can be applied to various circuit topologies, such as the system with high PF, the system with lower PF, single-stage architecture, or multi-stage architecture, to facilitate the use.

While the present invention has been particularly shown and described with reference to a preferred embodiment, it will be understood by those skilled in the art that various changes in form and detail may be without departing from the spirit and scope of the present invention.

What is claimed is:

1. A power controller with turn-on time configured according to a number of current limit operations, applied to a power system which includes a power supply module, a voltage divider, and a power switch, wherein the power supply module is utilized for providing an input voltage, the voltage divider is electrically connected to the power supply module for receiving the input voltage to generate a divided input voltage, and the power switch is electrically connected to the voltage divider, and the power controller comprising:
   a peak current setting unit, electrically connected to the voltage divider, and receiving a current limit turn-on time value for determining a peak current value according to the divided input voltage and the current limit turn-on time value;
   a comparator, electrically connected to the peak current setting unit and the power switch, for transmitting a first trigger signal once a current value of the power switch reaches the peak current value;
   a turn-on time calculation module, electrically connected to the peak current setting unit and the comparator, being set with a calculation time period and a target number of current limit operations, for calculating a count of the first trigger signals being received during the calculation time period to define a number of current limit operations, and calculating a set turn-on time value by using the current limit turn-on time value, the number of current limit operations, and the target number of current limit operations to do a recursive calculation;
   a timer, electrically connected to the turn-on time calculation module, for transmitting a second trigger signal when the set turn-on time value is counted; and
   a switch control module, electrically connected to the comparator, the timer, and the power switch, for transmitting a cutoff signal to the power switch to turn off the power switch when receiving one of the first trigger signal and the second trigger signal, and turning on the power switch after a cutoff time period;
   wherein the turn-on time calculation module transmits the set turn-on time value to the peak current setting unit to replace the current limit turn-on time value.

2. The power controller with turn-on time configured according to a number of current limit operations of claim 1, wherein the turn-on time calculation module comprises:
   a current limit calculation unit, being set with the calculation time period, and electrically connected to the comparator for defining the count of the first trigger signals received during the calculation time period as the number of current limit operations;
   a subtractor, electrically connected to the current limit calculation unit, for calculating a number difference of current limit operations between the target number of current limit operations and the number of current limit operations;
   a multiplier, electrically connected to the subtractor, being set with a multiplying value, for multiplying the number difference of current limit operations and the multiplying value to generate an multiplied time value; and
   an adder, electrically connected to the multiplier, for receiving the current limit turn-on time value, and adding the multiplied time value to the current limit turn-on time value to generate the set turn-on time value.

3. The power controller with turn-on time configured according to a number of current limit operations of claim 2, wherein the turn-on time calculation module further comprises a delay circuit, having an input and an output electrically connected to the adder for delaying the set turn-on time value.

4. The power controller with turn-on time configured according to a number of current limit operations of claim 3, wherein the delay circuit is an unit delay circuit.

5. The power controller with turn-on time configured according to a number of current limit operations of claim 1, wherein the switch control module comprises:
   an OR gate, electrically connected to the comparator and the timer, for transmitting an OR gate signal when receiving one of the first trigger signal and the second trigger signal; and
   an SR flip-flop, electrically connected to the OR gate and the power switch, for transmitting the cutoff signal when receiving the OR gate signal.

* * * * *